United States Patent Office 3,451,097
Patented June 24, 1969

3,451,097
VISCERA REMOVER
Billy F. Knight, Morristown, Tenn., assignor to Gainesville Machine Company, Gainesville, Ga., a corporation of Georgia
Filed Jan. 25, 1967, Ser. No. 611,680
Int. Cl. A22b 3/08; A22c 21/06
U.S. Cl. 17—11         5 Claims

ABSTRACT OF THE DISCLOSURE

A method and apparatus for removing the viscera of chickens, turkeys, and other edible fowls by exerting a vacuum in the cavity of an edible fowl to remove the viscera therefrom, especially the lungs and other organs located within the deeper portion of the fowl cavity.

BACKGROUND OF THE INVENTION

In the past, it has been customary to remove the entrails of fowl by hand, by cutting open the body of the fowl to expose the internal cavity, removing the major portion of the entrails by hand, and scraping the cavity with a small tool such as a toothed rake to scrape and gouge away from the cavity the remaining viscera located deep within the cavity and attached to the fowl. Of course, the hand method of removing viscera from fowl is somewhat cumbersome and time consuming even when performed by an experienced person, and the carcass of the fowl is sometimes damaged by misuse of the hand tool. The hand tool must be wedged between the carcass of the fowl and its organs in order to grip and pull the organs away from the carcass. Not only does this action occasionally damage the carcass of the fowl, but the various edible organs removed from the fowl, such as giblets, gizzards, and livers, are also occasionally damaged.

SUMMARY OF THE INVENTION

This invention comprises a method of exerting a vacuum within the cavity of the fowl to gently remove the viscera from the carcass of the fowl. The apparatus utilized to perform the method comprises a source of vacuum, an elongated nozzle, and means for selectively communicating the elongated nozzle with the source of vacuum. The elongated nozzle is bent so as to conform with the shape of the cavity of the fowl, and its end portion is truncated at an angle so that it terminates in a curved edge which is suitable for gently wedging between the viscera and the carcass of the fowl.

Thus, it is an object of this invention to provide a method and apparatus for gently removing the viscera from the carcass of a fowl without damaging the organs of the fowl.

Another object of this invention is to provide a method for exerting a vacuum within the carcass of a fowl to the viscera of the fowl from its carcass.

Another object of this invention is to provide apparatus for extering a vacuum within the carcass of a fowl to remove any viscera attached to the carcass.

Another object of this invention is to provide an expedient method and apparatus for removing the viscera from the carcass of a fowl that is convenient in use, inexpensive to manufacture, gentle in operation and well designed to meet the economics of manufacture.

Other objects, features and advantages of the present invention will become apparent upon reading the following specification, taken in conjunction with the accompanying drawing.

DESCRIPTION OF THE PREFERRED EMBODIMENT

Figure 1:
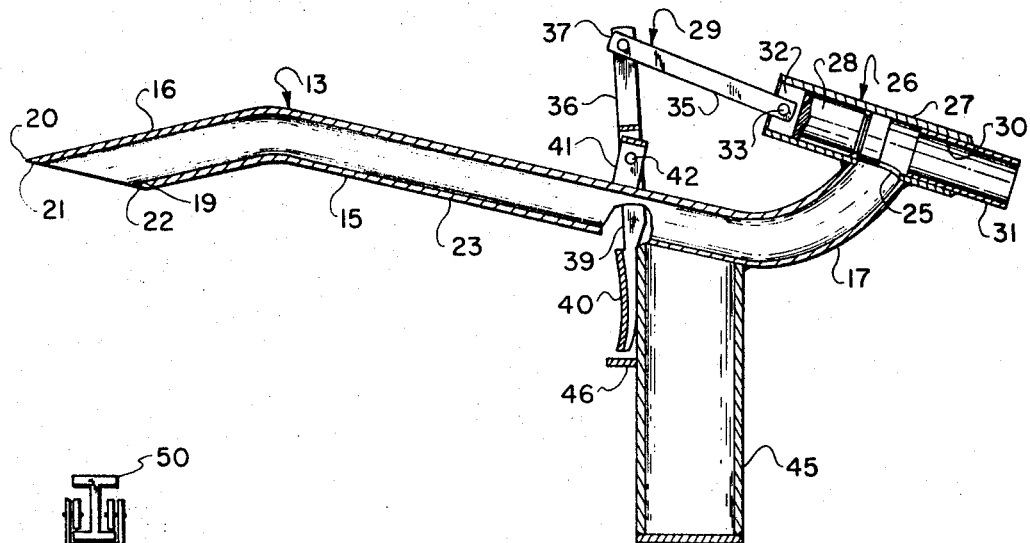
FIG. 1 is a side view, taken in cross section, of the viscera remover.

Referring now more particularly to the drawing, in which like numerals indicate like parts throughout the several views, the viscera remover 10 comprises a source of vacuum 11, a flexible conduit 12 and a nozzle 13. The nozzle 13 comprises an elongated conduit 15 including a downwardly extending end portion 16 and an upwardly extending rear portion 17. The end portion 16 is truncated to form an elliptical opening 19 which includes a rounded edge 20 with an outer portion 21 merging into an inner portion 22. The elliptical opening 19 is disposed in a plane substantially parallel to the axis of the main portion 23 of the elongated conduit 15.

The upwardly extending rear portion 17 of the elongated conduit 15 terminates in a circular opening 25. The circular opening 25 opens into valve 26 which comprises a valve housing 27 connetced at its midpoint to the cirular opening 25 of the rear portion 17 of the elongated conduit 15, valve plunger 28 which is slidably received in the housing 27 to selectively cover or uncover the circular opening 25, and trigger mechanism 29. The valve housing 27 is circular in cross section and includes a valve seat 30 concentrically disposed within the housing 27 and rigidly connected thereto by welding, or the like. The valve seat 30 is hollow and forms a continuation of the housing 27, and extends outwardly of the housing 27 to form a protrusion to which the flexible conduit 12 can be attached.

The valve plunger 28 is reciprocal in the housing 27 to seat on the end of the valve seat 30 and cover the circular opening 25 and movable away from the valve seat 30 to uncover the circular opening. The valve plunger 28 defines a slot 32 at its end remote from the valve seat 30 and a pin 33 extends therethrough in the vicinity of the slot 32. The trigger mechanism 29 includes a follower arm 35 pivotally connected to the valve plunger 28 by means of its pin 33 and a trigger arm 36 pivotally connected to the follower arm 35 at its end 37 remote from the valve plunger 28. The trigger arm is bifurcated and rigidly connected to closed trigger support 39 which surrounds the main portion 23 of the elongate conduit 15. A finger receiving tab or trigger 40 is connected to the trigger support on the side thereof extending downwardly from the conduit 15. The trigger support 39 is pivotally connected to the U-shaped bracket 41 by means of a pin 42. The U-shaped bracket 41 is connected at its ends, by means of welding or the like, to the exterior surface of the conduit 15, and the pin 42 extends through the arms thereof and through the trigger support 39.

A handle or hand support device 45 is connected to the lower surface of the conduit 15 between the trigger 40 and the upwardly extending rear portion 17 of the conduit 15. A finger guide 46 is rigidly connected to the handle 45 at a position immediately below the end of the trigger 40 so that the fingers of the operator will normally be prevented from sliding up the handle 45 to a position where they would be between the handle 45 and the trigger 40.

It is desirable to fabricate the nozzle 13 of the viscera remover 10 from a lightweight material, such as aluminum, plastic, a mixture of these materials, or other lightweight materials. In one successful embodiment of the invention, all of the components of the nozzle 13 except the valve plunger 28 were formed from aluminum. The valve plunger 28 was of plastic material. Of course, it is desirable to utilize materials that are easily cleaned and will not be damaged by extended use or abuse on behalf of the operator.

OPERATION

Figure 3:
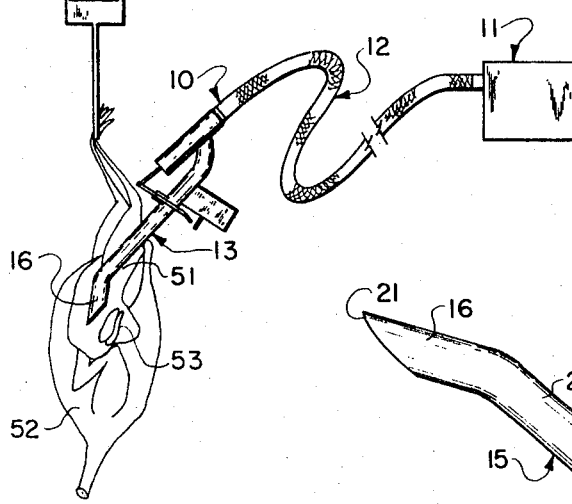
FIG. 3 is a schematic view of the viscera remover, and the manner in which it is utilized.
Figure 2:
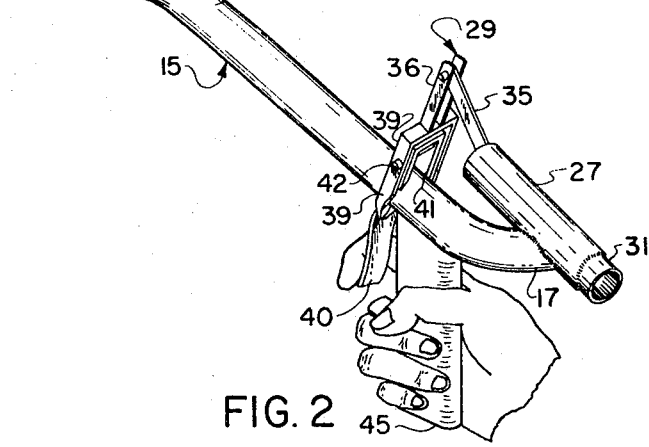
FIG. 2 is a perspective view of the viscera remover, showing the manner in which it is gripped by the operator.

When fowls, such as chickens or turkeys, are prepared for marketing, they are customarily suspended from an overhead conveyor, such as conveyor 50, and transported to various operating positions in the chicken treatment plant. When the chickens get to the position in the plant where the viscera remover is to be employed, the operator merely tilts the carcass of the chicken, as is shown in FIG. 3, to expose the cavity 51 of the carcass 52. The nozzle 13 is then inserted into the cavity 51 and the trigger 40 depressed so as to open the valve 26 and communicate the source of vacuum 11 with the conduit 15. The downwardly extending end portion 16 of the elongated conduit 15 of the nozzle is shaped so that it glides along the interior portion of the cavity 51 while the handle 45 is maintained in a convenient position for the operator. The rounded edge 20 of the elliptical opening 19 gently slides along the interior portion of the cavity 51 without damaging the carcass 52. The continuous suction of the nozzle 13 is effective to remove the viscera present in the cavity 51 of the fowl. Any viscera remaining attached to the carcass 52 can be gently pried away from the carcass by the outer portion 21 of the rounded edge 20 of the nozzle 13. The elliptical opening 19 presents a wide opening through which the vacuum can be applied to the viscera of the fowl, yet the elongated conduit 15 is relatively small in its cross sectional dimension. The outer portion 21 of the elliptical opening 19 is sufficiently removed from the inner portion 22 thereof a distance so that a gentle raking or scraping movement can be applied by the operator to the interior surface of the cavity 51 of the carcass 52 with the outer portion 21 of the rounded edge 20, without having the inner portion 22 interfering with this operation. Of course, the portion of the rounded edge 20 extending between the outer portion 21 and the inner portiton 22 is also effective in this operation when raking or scraping the sides of the carcass cavity.

The viscera remover has been found to be especially effective in removing the lungs 53 of fowl. Lungs are one of the most difficult of the organs to remove from fowl since they are rather spongy, positioned at the deepest portion of the cavity 51, and firmly connected to the carcass 52. The downwardly extending end portion 16 of the nozzle 13 is bent at an angle to easily reach the bottom of the cavity 51 of the carcass 52 without damaging the carcass, and the elliptical opening 19 is especially suitable for placement over the lungs 53.

The vacuum exerted by the source of vacuum 11 tends to pull the valve plunger 28 to its closed position. Accordingly, when the operator releases the trigger 40, the valve 26 will seat automatically on the valve seat 30 to cut off the flow of air through the nozzle 13. This feature prevents the operator from inadvertently sucking extraneous objects through the viscera remover, and allows the operator to cut off the source of vacuum from the nozzle 13 if the elliptical opening 19 is closed by being pressed against the interior surface of the cavity 51 of the fowl 52. In other words, if the suction were always applied through the nozzle 13, the operator might encounter difficulty in removing the nozzle from the cavity of the fowl since it would tend to cling to the fowl. The trigger mechanism and valve assembly allow the operator to apply the vacuum at intervals, or with intermittent bursts, so that if the opening 19 begins to draw onto the interior portion of the cavity 51 the operator can release the trigger to close the valve 26 and the nozzle 13 will be released from the carcass 52. This feature allows a strong vacuum to be applied through the nozzle 13 so that the viscera can be subjected to a strong flow of air flowing through the conduit 15.

With the foregoing described construction, the operator is able to gently remove the organs of fowl from their body cavities without damaging the organs or the carcass of the fowl. Furthermore, the operation is expediently performed under sanitary conditions.

It will be obvious to those skilled in the art that many variations may be made in the embodiment chosen for the purpose of illustrating the present invention.

What is claimed as my invention is:

1. Apparatus for removing viscera from a carcass having means for insertion into the cavity of a carcass, and a source of vacuum for drawing a vacuum in the cavity of the carcass, wherein said means for insertion comprises:
   an elongated hollow tube including a downwardly extending end portion and an upwardly extending rear portion,
   said end portion of said tube being truncated at an angle with respect to its longitudinal axis and defining an elliptical opening,
   a valve having a vacuum actuated plunger communicating with said tube at said rear portion, said valve being operative to selectively communicate said tube with said source of vacuum.

2. The invention of claim 1 wherein a handle is connected to said tube and a trigger mechanism is pivotally connected to said tube and to said valve for operating said plunger within said valve, said trigger mechanism being free floating until actuated by said source of vacuum.

3. The invention of claim 2 wherein the plunger of said valve is constructed and arranged to be biased toward its closed position by said source of vacuum.

4. Apparatus for removing lungs and other viscera from fowl comprising:
   an elongated conduit including a rectilinear main body portion and an end portion extending at an angle therefrom, said end portion being truncated at an angle to form an elliptical opening disposed in a plane extending substantially parallel to the longitudinal axis of said main body portion, valve means connected to said elongated conduit for selectively communicating said elongated conduit to a vacuum source, and a plunger in said valve means actuated by said vacuum source to close said valve and trigger mechanism connected to said plunger for manual opening said valve against the pull of said vacuum source.

5. The invention of claim 4 wherein said trigger mechanism and said plunger are free floating in the absence of said vacuum source, and further including free floating trigger means connected to said elongated conduit for actuating said valve means.

References Cited

UNITED STATES PATENTS

| 2,448,693 | 9/1948 | Trelease et al. | 17—11 |
| 2,723,831 | 11/1955 | Ine | 17—11 X |
| 2,997,736 | 8/1961 | Ine | 17—11 |
| 3,203,663 | 8/1965 | Basham et al. | 17—11 X |
| 3,234,586 | 2/1966 | Smith | 17—11 |

LUCIE H. LAUDENSLAGER, Primary Examiner.

U.S. Cl. X.R.

17—45; 251—25